Nov. 4, 1924.
C. D. SCHMIDT
1,513,864
AIR COOLED BRAKE OR CLUTCH
Original Filed May 16, 1922
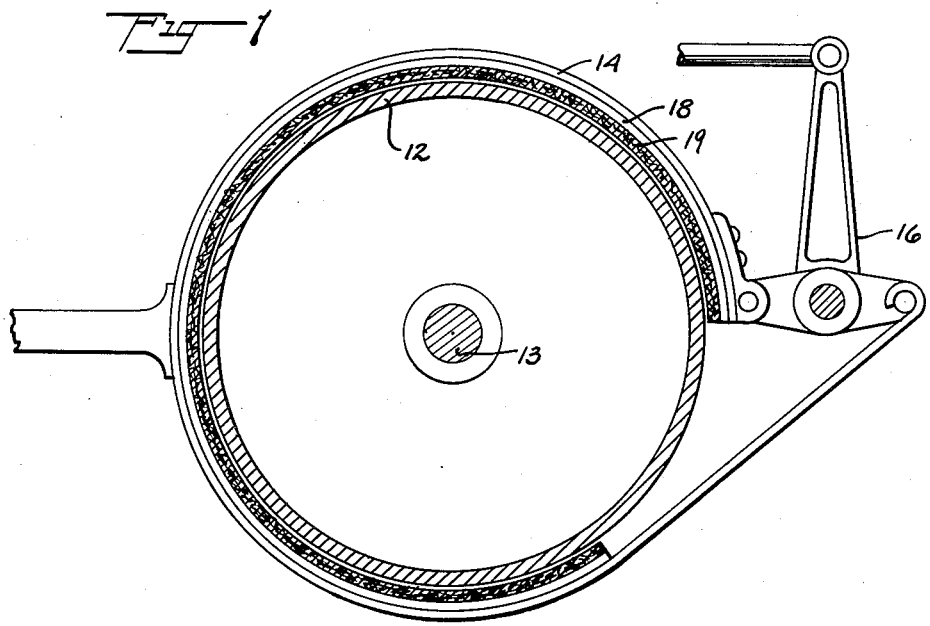
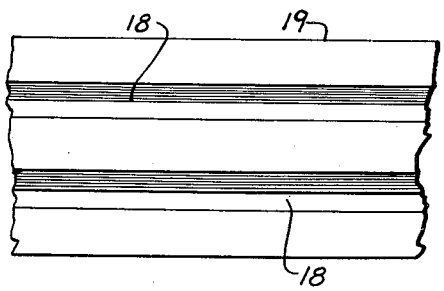
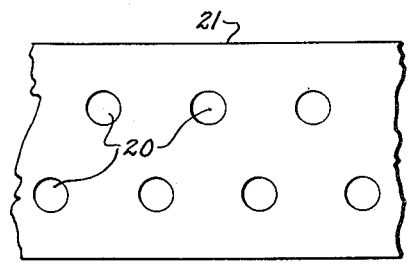
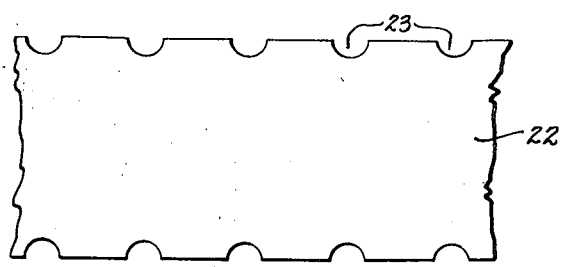
INVENTOR
Charles D. Schmidt
BY
Edwards, Sager & Bower
his ATTORNEYS Patented Nov. 4, 1924.

1,513,864

UNITED STATES PATENT OFFICE.

CHARLES D. SCHMIDT, OF JAMAICA, NEW YORK.

AIR-COOLED BRAKE OR CLUTCH.

Original application filed May 16, 1922, Serial No. 561,350. Divided and this application filed April 10, 1924. Serial No. 705,480.

*To all whom it may concern:*

Be it known that I, CHARLES D. SCHMIDT, a citizen of the United States, residing at Jamaica, in the county of Queens and State of New York, have invented certain new and useful Improvements in Air-Cooled Brakes or Clutches, of which the following is a specification.

This invention relates to brakes or clutches of automotive vehicles and the like and particularly to the cooling of the brake or clutch to protect it from overheating and burning. The usual brake or clutch is provided with a replaceable lining of woven material such as asbestos or cotton or a mixture with which is intermingled metal strands, the whole being impregnated with a rubberized compound; or sometimes a fibre material is used. These flat bands or brake lining are fastened to the brake bands or the brake drum shoes by means of rivets or the like and the heat generated during the braking action is more or less confined to the body of the brake lining and directly transmitted to the shoe or band.

The main object of this invention is to provide a brake or clutch in which the lining is air cooled.

In the accompanying drawings illustrating the invention—

Fig. 1 is a diagrammatic sectional view of a brake having an outer band provided with an air cooled lining.

Fig. 2 is a plan view of the air cooled surface of the lining shown in Fig. 1, and Figs. 3 and 4 are views similar to Fig. 2 but illustrating modifications.

In the specific embodiment of the invention illustrated in Fig. 1 a brake drum 12 rotating on the shaft 13 is provided with an outer flexible band 14 carrying a brake lining 19 which is drawn against the periphery of the drum by the operating mechanism 16 as shown. The outer surface of the lining 19 in contact with the band 14 is provided with grooves or creases 18 of the lining 19 carried lengthwise of the band. In Fig. 3 a series of staggered holes 20 are punched in the lining 21 and in Fig. 4 the edges of the lining 22 are clipped out as indicated at 23 so as to act as little fins and give a greater area for the radiation of heat.

In all of these modifications the radiating surface of the lining in contact with the air is increased in area so that the circulation of the air will provide an additional cooling effect tending to maintain a lower temperature of the lining and avoid overheating and burning. The form of the air spaces may be any design that will effect less contact of its surface with the part to which it is fixed, while the other or braking side preferably has a flat surface and full bearing area. All of these designs provide air spaces between the brake lining and the part to which it is fixed so as to introduce air cooling means. The formation of the lining so as to contact only at intervals with the supporting band also permits the lining to adapt itself more readily to the formation of the drum so as to give a more homogeneously distributed braking effect. While the invention has been described in connection with specific modifications it is not confined thereto but is intended to cover such variations as fall within the scope of the appended claims. The lining of this invention may of course also be used with an internal expanding brake or with a clutch.

This application is a division of my co-pending application Serial Number 561,350, filed May 16, 1922.

I claim:—

1. A lining for brakes and clutches formed with air spaces arranged lengthwise of the lining surface opposite the braking surface of the lining.

2. A lining for brakes and clutches formed with air spaces extending lengthwise of the lining surface opposite the braking surface of the lining.

3. A lining for brakes and clutches formed with air spaces extending lengthwise of the lining surface opposite the braking surface of the lining, said opposite surface being adapted to contact with a supporting means at separated areas.

4. A lining for brakes and clutches formed with air spaces extending lengthwise of the lining surface opposite the braking surface of the lining, said opposite surface being adapted to contact with a supporting means at separated areas extending lengthwise of the lining.

CHARLES D. SCHMIDT.